(12) United States Patent
Suzuki et al.

(10) Patent No.: US 10,655,741 B2
(45) Date of Patent: May 19, 2020

(54) ROTARY JOINT

(71) Applicant: NIPPON PILLAR PACKING CO., LTD., Osaka (JP)

(72) Inventors: Osamu Suzuki, Osaka (JP); Junya Okumura, Osaka (JP)

(73) Assignee: NIPPON PILLAR PACKING CO., LTD., Osaka (JP)

( * ) Notice: Subject to any disclaimer, the term of this patent is extended or adjusted under 35 U.S.C. 154(b) by 184 days.

(21) Appl. No.: 15/656,608

(22) Filed: Jul. 21, 2017

(65) Prior Publication Data
US 2018/0058593 A1    Mar. 1, 2018

(30) Foreign Application Priority Data

Aug. 24, 2016 (JP) .................................. 2016-163363

(51) Int. Cl.
  *F16L 39/06* (2006.01)
  *F16L 39/04* (2006.01)
  *F16K 11/085* (2006.01)

(52) U.S. Cl.
  CPC ............ *F16K 11/085* (2013.01); *F16L 39/04* (2013.01); *F16L 39/06* (2013.01)

(58) Field of Classification Search
  CPC ..... F16K 11/085; F16K 11/0856; F16J 15/16; F16J 15/34; F16J 15/40; F16J 15/42;
(Continued)

(56) References Cited

U.S. PATENT DOCUMENTS 2,768,843 A * 10/1956 Zeilman .................. B66C 13/18
                                              285/124.1
5,110,159 A *  5/1992 Herold .................... B41F 13/00
                                              285/121.3
(Continued)

FOREIGN PATENT DOCUMENTS

DE     1907081 A1 *  9/1970  .............. F16L 39/06
JP    52022860 U1    2/1977
(Continued)

OTHER PUBLICATIONS

English Machine Translation of JP-2003-042306, Publication Date: Feb. 13, 2003.
(Continued)

*Primary Examiner* — Hailey K. Do
(74) *Attorney, Agent, or Firm* — Millen, White, Zelano & Branigan, P.C.; William Nixon

(57) ABSTRACT

A rotary joint includes a tubular case body, an outer cylinder body provided to be relatively rotatable inside the case body, an inner shaft body provided to be relatively rotatable inside the outer cylinder body, a first mechanical seal for forming flow passages that connect a first flow passage of the case body and a second flow passage of the outer cylinder body to each other by dividing a first annular space formed between the case body and the outer cylinder body, and a second mechanical seal for forming flow passages that connect a third flow passage of the outer cylinder body and a fourth flow passage of the inner shaft body to each other by dividing a second annular space formed between the outer cylinder body and the inner shaft body.

3 Claims, 8 Drawing Sheets

(58) Field of Classification Search
CPC ......... B41F 13/00; F16L 39/005; F16L 39/04; F16L 39/06; F16L 27/08; F16L 27/087; Y10T 137/86268
USPC ................. 285/121.1, 121.3, 121.4, 121.5
See application file for complete search history.

(56) References Cited

U.S. PATENT DOCUMENTS

| | | | |
|---|---|---|---|
| 5,529,347 A * | 6/1996 | Lee | B66C 23/84 285/121.3 |
| 2017/0074445 A1* | 3/2017 | Kikuyama | F16L 39/04 |

FOREIGN PATENT DOCUMENTS

| | | |
|---|---|---|
| JP | 59070992 U | 5/1984 |
| JP | 8121664 A | 5/1996 |
| JP | 2003-042306 A | 2/2003 |

OTHER PUBLICATIONS

Office Action in corresponding JP appl. 2016-163363 (pp. 1-4) dated Feb. 12, 2020.

* cited by examiner

ROTARY JOINT

BACKGROUND OF THE INVENTION

Technical Field

The present invention relates to a rotary joint including a mechanical seal.

Background Art

A rotary joint is used to connect a flow passage of a fixed side member and a flow passage of a rotating side member to each other. For example, a chemical mechanical polishing device (CMP device) is used to perform surface polishing treatment of a semiconductor wafer. In this CMP device, a sealed fluid such as polishing liquid, pressurizing air, washing water, pure water, air blowing air, polishing residual liquid, etc. flows between a rotating side member (a turntable or a top ring) and a fixed side member (a main body of the CMP device) supporting the rotating side member.

A plurality of independent fluid passages is used for a joint portion that connects between the rotating side member and the fixed side member to allow the sealed fluid to flow between the rotating side member and the fixed side member without mixing. In this regard, for example, a multi-port type rotary joint disclosed in JP 2003-42306 A is used as the joint portion.

FIG. 8 is a longitudinal sectional view of a conventional rotary joint. This rotary joint includes a tubular case body 80, a shaft body 83 rotatably provided in the case body 80, and a plurality of mechanical seals 86 arranged side by side in an axial direction (vertical direction of FIG. 8) in an annular space 84 between the case body 80 and the shaft body 83.

Each of the mechanical seals 86 includes a pair of static seal rings 91 attached to the case body 80, a rotary seal ring 92 that rotates integrally with the shaft body 83, and a plurality of coil springs 97. In addition, a plurality of independent fluid passages 85 is provided in the rotary joint.

The shaft body 83 includes a shaft main body 87 and a sleeve 89 fit onto the shaft main body 87. The sleeve 89 and the rotary seal ring 92 of the mechanical seal 86 are alternately disposed along the axial direction. In addition, the sleeve 89 and the rotary seal ring 92 are pressed in the axial direction by a pressing member 90 fastened to the shaft main body 87 through a bolt 90a. A state in which the rotary seal ring 92 and the sleeve 89 are alternately pressed is obtained by a pressing force of the pressing member 90, and all the sleeve 89 and the rotary seal ring 92 may rotate integrally with the shaft main body 87 due to a frictional force therebetween.

A first flow passage 81 open to an outer circumferential side and an inner circumferential side is formed in the case body 80. Further, a second flow passage 82 which is open on the outer circumferential side is formed in the shaft body 83 including the shaft main body 87 and the sleeve 89. A flow passage hole 87a corresponding to one portion of the second flow passage 82 is formed in the shaft main body 87, and a through-hole 88 corresponding to the other portion of the second flow passage 82 is formed at a central part of the sleeve 89 in the axial direction. The through-hole 88 is connected to the flow passage hole 87a and serves as an opening hole of the second flow passage 82 on the outer circumferential side.

In addition, an O-ring 93 is provided among the shaft main body 87, the sleeve 89, and the rotary seal ring 92 to prevent a sealed fluid that flows through each second flow passage 82 from entering another flow passage or leaking to the outside.

One first flow passage 81 and one second flow passage 82 are open at the same height position in the axial direction, and one independent fluid passage 85 is configured by the first flow passage 81 and the second flow passage 82. For this reason, the mechanical seal 86 is provided in the annular space 84. In more detail, static seal rings 91 and 91 of the mechanical seal 86 are provided between rotary seal rings 92 and 92 adjacent to each other with the sleeve 89 interposed therebetween on the outside of the sleeve 89 in a radial direction, and an annular flow passage 96 connecting the second flow passage 82 (through-hole 88) and the first flow passage 81 to each other is formed between these static seal rings 91 and 91. The static seal ring 91 is prevented from rotating around the case body 80 by engaging a drive pin 95 fixed to the case body 80 with a claw portion (depression) 94, etc. provided in a part of the static seal ring 91.

The coil spring 97 included in the mechanical seal 86 presses the static seal ring 91 in the axial direction with respect to the rotary seal ring 92, and the static seal ring 91 comes into contact with the rotary seal ring 92 adjacent to the static seal ring 91 in the axial direction to prevent a sealed fluid from leaking from between surfaces coming into contact with each other. In other words, a part of a side surface of the static seal ring 91 in the axial direction serves as a sealing surface 91a, and a part of an annular side surface of the rotary seal ring 92 serves as a sealing surface 92a coming into sliding contact with the sealing surface 91a. A lubricating film is formed between these sealing surfaces 91a and 92a by a sealing liquid to obtain a lubricating effect.

As described above, the shaft main body 87, the sleeve 89, and the rotary seal ring 92 may integrally rotate with respect to the case body 80, and the rotating rotary seal ring 92 comes into sliding contact with the static seal ring 91 corresponding to a stationary side to exhibit a function as the mechanical seal 86. In this way, it is possible to form the independent fluid passage 85.

SUMMARY

In the above-described rotary joint, the same number of mechanical seals 86 as the number of fluid passages 85 (the number of ports) need to be arranged side by side in the axial direction in the annular space 84. For this reason, a whole length of the rotary joint in the axial direction increases, and a problem that the rotary joint may not be mounted occurs depending on the device.

In this regard, it is considered that each of components in the used mechanical seal 86 is designed to be small to suppress the increase in the whole length of the rotary joint in the axial direction. In this case, a new problem that seal performance of the mechanical seal 86 is degraded occurs.

The invention has been conceived in view of such circumstances, and an object of the invention is to provide a rotary joint, the whole length of which in the axial direction may be inhibited from increasing without degrading the seal performance.

A rotary joint of the invention includes a tubular case body in which a first flow passage open on an inner circumferential side is formed, an outer cylinder body provided to be relatively rotatable inside the case body, a second flow passage open on an outer circumferential side and a third flow passage open on an inner circumferential side being formed in the outer cylinder body, an inner shaft body provided to be relatively rotatable inside the outer cylinder body, a fourth flow passage open on an outer circumferential side being formed in the inner shaft body, a first mechanical seal provided in a first annular space formed between the case body and the outer cylinder body to form a flow passage that connects the first flow passage and the second flow passage to each other by dividing the first annular space, and a second mechanical seal provided in a second annular space formed between the outer cylinder body and the inner shaft body to form a flow passage that connects the third flow passage and the fourth flow passage to each other by dividing the second annular space.

In the rotary joint configured as described above, one fluid passage in which the first flow passage of the case body and the second flow passage of the outer cylinder body are connected through the flow passage of the first mechanical seal is formed by the first mechanical seal provided in the first annular space corresponding to the outer circumferential side of the outer cylinder body. In addition, in the rotary joint, another fluid passage in which the third flow passage of the outer cylinder body and the fourth flow passage of the inner shaft body are connected through the flow passage of the second mechanical seal is formed by the second mechanical seal provided in the second annular space corresponding to the inner circumferential side of the outer cylinder body.

That is, two different fluid passages may be formed by providing mechanical seals in two respective annular spaces formed on the outer circumferential side and the inner circumferential side of the outer cylinder body. Therefore, it is possible to suppress an increase in whole length of the rotary joint in the axial direction when compared to a case in which mechanical seals are arranged side by side in the axial direction in one annular space as in the past. In addition, since each component in the mechanical seals may not be formed to be small, seal performance is not degraded.

In the rotary joint, it is preferable that a plurality of first mechanical seals is provided in an axial direction of the first annular space, and a plurality of second mechanical seals is provided in an axial direction of the second annular space.

When the number of fluid passages is increased, a plurality of fluid passages and a plurality of fluid passages different from each other may be formed by arranging mechanical seals side by side in the axial direction on each of the outer circumferential side (first annular space) and the inner circumferential side (second annular space) of the outer cylinder body. Therefore, even when the number of respective fluid passages increases, it is possible to suppress an increase in whole length of the rotary joint in the axial direction when compared to a case in which mechanical seals are arranged side by side in the axial direction in one annular space as in the past.

In the rotary joint, it is preferable that the rotary joint further includes a first communication path formed using a part of the first mechanical seal to allow communication between a first sealing liquid region and an opening of a through-hole on one end side, and a second communication path formed using a part of the second mechanical seal to allow communication between a second sealing liquid region and an opening of the through-hole on the other end side, wherein the first sealing liquid region in which a sealing liquid is supplied between the first mechanical seal and the case body is formed in the first annular space, the second sealing liquid region in which a sealing liquid is supplied between the second mechanical seal and the inner shaft body is formed in the second annular space, and the through-hole is formed in the outer cylinder body to penetrate thereto in a radial direction across an outer circumferential surface and an inner circumferential surface thereof.

In this case, since the first sealing liquid region and the second sealing liquid region are connected through the first communication path, the through-hole of the outer cylinder body, and the second communication path, the sealing liquid may be supplied to one of the first sealing liquid region and the second sealing liquid region by supplying the sealing liquid to the other one. Therefore, only one inlet flow passage for the sealing liquid may be formed in the rotary joint, and thus a structure may be simplified.

In the rotary joint, it is preferable that the rotary joint further includes a connection body that connects one end portion of the inner shaft body in an axial direction and the case body to each other across one end portion of the outer cylinder body in an axial direction.

In this case, since the one end portion of the inner shaft body in the axial direction and the case body are integrated by the connection body, one of a bearing that supports the one end portion of the outer cylinder body in the axial direction in a relatively rotatable manner with respect to the case body and a bearing that supports the one end portion of the inner shaft body in the axial direction in a relatively rotatable manner with respect to the one end portion of the outer cylinder body in the axial direction may not be provided. In this way, the number of parts may be reduced, and thus it is possible to further attempt simplification of the structure and a reduction in manufacturing cost.

According to a rotary joint of the invention, it is possible to suppress an increase in whole length in an axial direction without degrading the seal performance.

DESCRIPTION OF EMBODIMENTS

Next, a description will be given of a preferred embodiment of the invention with reference to accompanying drawings.

[Overall Configuration]

Figure 1:
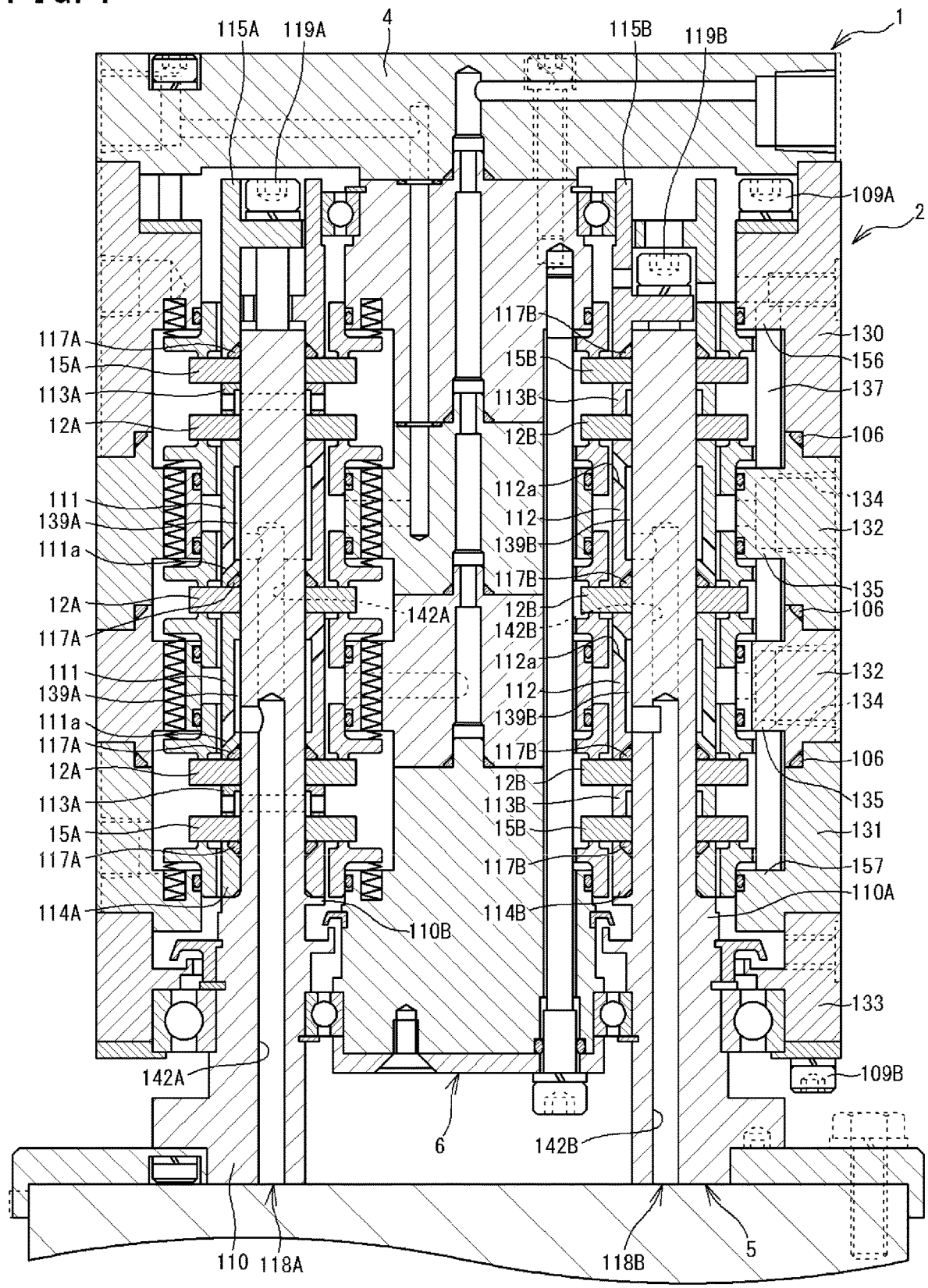
FIG. 1 is a longitudinal sectional view illustrating a rotary joint according to an embodiment of the invention and is an explanatory view of a case body and an outer cylinder body.

FIG. 1 is a longitudinal sectional view illustrating a rotary joint according to an embodiment of the invention. In FIG. 1, a rotary joint 1 (hereinafter also referred to as a joint 1) includes a tubular case body 2, a connection body 4, and an inner shaft body 6 attached to a fixed side member (for example, a main body of a CMP device) of a rotating machine, and an outer cylinder body 5 attached to a rotating side member (for example, a turntable or a top ring of the CMP device) of the rotating machine.

A posture of the joint 1 may correspond to a posture other than a posture illustrated in FIG. 1. In the present embodiment, an upper side illustrated in FIG. 1 is set to "up" of the joint 1, and a lower side is set to "down" of the joint 1. In addition, in the invention, an "axial direction" refers to a direction along a center line of the rotary joint 1 (including a direction parallel to the center line), and respective center lines of the case body 2, the connection body 4, the outer cylinder body 5, the inner shaft body 6, and mechanical seals 7A and 7B described below are configured to conform to the center line of the rotary joint 1. In addition, in the invention, a "radial direction" refers to a direction orthogonal to the center line of the rotary joint 1.

[Case Body]

The case body 2 includes N (N is an integer greater than or equal to 1, and N=2 in this example) flow passage flanges 132 disposed on upper and lower sides, an upper flange 130 and a lower flange 131 disposed on upper and lower sides of the flow passage flanges 132, and a support flange 133 disposed on a lower side of the lower flange 131.

These flanges 130 to 133 are formed in an annular shape, the flanges 130, 132, and 131 are connected and fixed in a vertically stacked state by a bolt 109A, and the flanges 131 and 133 are connected and fixed in a vertically stacked state by a bolt 109B. In this way, the case body 2 corresponds to a tubular structure as a whole.

O-rings 106 are provided between the flow passage flanges 132 and 312 adjacent to each other, between the upper flange 130 and the flow passage flange 132 adjacent to each other, and between the lower flange 131 and the flow passage flange 132 adjacent to each other, respectively.

The upper flange 130 and the lower flange 131 have annular protrusions 156 and 157 protruding inward in the radial direction. Similarly, each flow passage flange 132 has an annular protrusion 135 protruding inward in the radial direction. In addition, a first flow passage 134 through which a sealed fluid flows is formed in each flow passage flange 132 by penetrating therethrough in the radial direction to pass through the protrusion 135. Examples of the sealed fluid include polishing liquid, pressurizing air, washing water, pure water, air blowing air, polishing residual liquid, etc. In the present embodiment, air is used as the sealed fluid.

Both end portions of the first flow passage 134 is open on an inner circumferential side and an outer circumferential side of the flow passage flange 132. In the present embodiment, openings of the flow passage flange 132 on the outer circumferential side serve as connection ports to which a plurality of respective pipes of the fixed side member is connected. As described above, a plurality of first flow passages 134 is formed in the case body 2.

[Outer Cylinder Body]

The outer cylinder body 5 is concentrically disposed inside the case body 2 and includes a linear tubular main body 110 which is long in the vertical direction, an outer sleeve 111 fit onto the tubular main body 110, and an inner sleeve 112 fit into the tubular main body 110.

In addition to the outer sleeve 111, an annular rotary seal ring 12A of the first mechanical seal 7A described below is fit onto an outer circumference of the tubular main body 110. The outer sleeve 111 and the rotary seal ring 12A are alternately disposed along the axial direction. N outer sleeves 111 are provided, and (N+1) rotary seal rings 12A are provided.

An annular rotary seal ring 15A of an end mechanical seal 9A described below is fit onto each of an upper portion of the rotary seal ring 12A disposed on an uppermost side and a lower portion of the rotary seal ring 12A disposed on a lowermost side through an annular outer spacer 113A on the outer circumference of the tubular main body 110. In addition, an end sleeve 114A is further fit onto the lower portion of the rotary seal ring 15A on the lower side on the outer circumference of the tubular main body 110.

A tubular pressing member 115A that presses the rotary seal ring 15A, the outer spacer 113A, the rotary seal ring 12A, the outer sleeve 111, and the end sleeve 114A downward is fixed to an upper end portion of the outer circumference of the tubular main body 110 by a bolt 119A.

An outer regulating portion 110A protruding outward in the radial direction is formed on a lower part side (one side in the axial direction) of the tubular main body 110. The outer regulating portion 110A regulates downward movement of the rotary seal ring 15A, the outer spacer 113A, the rotary seal ring 12A, the outer sleeve 111, and the end sleeve 114A fit onto the tubular main body 110.

As described above, the whole rotary seal ring 15A, the whole outer spacer 113A, the whole rotary seal ring 12A, the whole outer sleeve 111, and the end sleeve 114A are pressed in the axial direction toward the outer regulating portion 110A of the tubular main body 110 by fastening the pressing member 115A using the bolt 119A.

A pressing force (fastening force in the axial direction) by the pressing member 115A is uniform in a circumferential direction. Due to this pressing force, the outer sleeve 111 is pressed against the rotary seal ring 12A, and the outer spacer 113A is pressed against the rotary seal ring 12A and the rotary seal ring 15A. In addition, the end sleeve 114A is pressed against the rotary seal ring 15A and the outer regulating portion 110A.

In this way, the whole rotary seal ring 15A, the whole outer spacer 113A, the whole rotary seal ring 12A, the whole outer sleeve 111, and the end sleeve 114A are integrated with the tubular main body 110 and rotatable integrally with the tubular main body 110 due to a frictional force therebetween.

In addition to the inner sleeve 112, an annular rotary seal ring 12B of the second mechanical seal 7B described below is fit onto an inner circumference of the tubular main body 110. Further, the inner sleeve 112 and the rotary seal ring 12B are alternately disposed along the axial direction. M (M is an integer greater than or equal to 1, and M=2 in this example) inner sleeves 112 are provided, and (M+1) rotary seal rings 12B are provided.

An annular rotary seal ring 15B of an end mechanical seal 9B described below is fit into each of an upper portion of the rotary seal ring 12B disposed on an uppermost side and a lower portion of the rotary seal ring 12B disposed on a lowermost side through an annular inner spacer 113B on the inner circumference of the tubular main body 110. In addition, an end sleeve 114B is further fit into the lower portion of the rotary seal ring 15B on the lower side on the inner circumference of the tubular main body 110.

A tubular pressing member 115B that presses the rotary seal ring 15B, the inner spacer 113B, the rotary seal ring 12B, the inner sleeve 112, and the end sleeve 114B downward is fixed to an upper end portion of the inner circumference of the tubular main body 110 by a bolt 119B.

An inner regulating portion 110B protruding inward in the radial direction is formed on the lower part side (one side in the axial direction) of the tubular main body 110. The inner regulating portion 110B regulates downward movement of the rotary seal ring 15B, the inner spacer 113B, the rotary seal ring 12B, the inner sleeve 112, and the end sleeve 114B fit into the tubular main body 110.

As described above, the whole rotary seal ring 15B, the whole inner spacer 113B, the whole rotary seal ring 12B, the whole inner sleeve 112, and the end sleeve 114B are pressed in the axial direction toward the inner regulating portion 110B of the tubular main body 110 by fastening the pressing member 115B using the bolt 119B.

A pressing force (fastening force in the axial direction) by the pressing member 115B is uniform in the circumferential direction. Due to this pressing force, the inner sleeve 112 is pressed against the rotary seal ring 12B, and the inner spacer 113B is pressed against the rotary seal ring 12B and the rotary seal ring 15B. In addition, the end sleeve 114B is pressed against the rotary seal ring 15B and the inner regulating portion 110B.

In this way, the whole rotary seal ring 15B, the whole inner spacer 113B, the whole rotary seal ring 12B, the whole inner sleeve 112, and the end sleeve 114B are integrated with the tubular main body 110 and rotatable integrally with the tubular main body 110 due to a frictional force therebetween.

[Flow Passage of Outer Cylinder Body]

Figure 2:
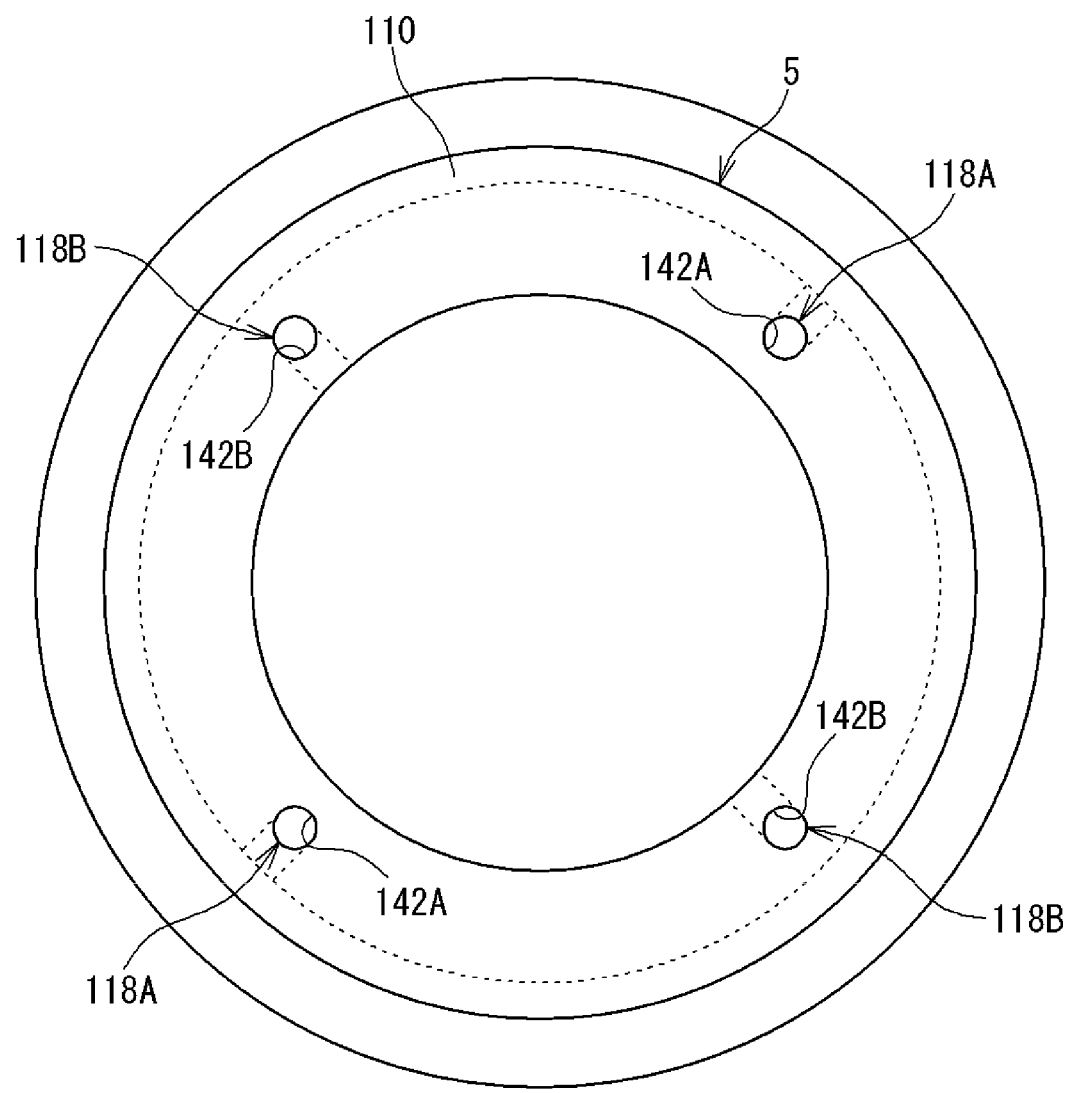
FIG. 2 is a plan view of the outer cylinder body viewed from below.

FIG. 2 is a plan view of the outer cylinder body 5 viewed from below. In FIG. 1 and FIG. 2, N (two in this example) second flow passage holes 142A and M (two in this example) third flow passage holes 142B through which the sealed fluid flows are formed to extend in the vertical direction (axial direction) in an inner portion (thickness portion) of the tubular main body 110.

For example, the respective second flow passage holes 142A are formed at an interval of 180° in the circumferential direction of the tubular main body 110. In addition, upper end sides of the respective second flow passage holes 142A are open at different height positions in the vertical direction on an outer circumferential surface of the tubular main body 110. A lower end side of the second flow passage hole 142A is open on a lower end surface of the tubular main body 110, and each of a plurality of pipes of the rotating side member is connected to an opening on the lower end surface.

For example, the respective third flow passage holes 142B are formed at an interval of 180° in the circumferential direction of the tubular main body 110, and are formed at equal intervals (90°) from the respective second flow passage holes 142A. In addition, respective upper end sides of the third flow passage holes 142B are open at different height positions in the vertical direction on the inner circumferential surface of the tubular main body 110. A lower end side of the third flow passage hole 142B is open on the lower end surface of the tubular main body 110, and each of the plurality of pipes of the rotating side member is connected to an opening on the lower end surface.

A plurality of through-holes 111a is formed in the outer sleeve 111 to penetrate therethrough in the radial direction at equal intervals in the circumferential direction. In addition, an annular gap 139A is formed between the outer sleeve 111 and the outer circumferential surface of the tubular main body 110 on the inside of the outer sleeve 111 in the radial direction, and each of the through-holes 111a is connected to the annular gap 139A. In addition, this annular gap 139A is connected to the second flow passage holes 142A of the tubular main body 110. Further, one second flow passage 118A through which the sealed fluid flows is configured by one second flow passage hole 142A inside the tubular main body 110, an annular gap 139A inside one outer sleeve 111, and the plurality of through-holes 111a in the outer sleeve 111.

O-rings 117A are provided among the tubular main body 110, the outer sleeve 111, and the rotary seal ring 12A, among the tubular main body 110, the pressing member 115A, and the rotary seal ring 15A, and among the tubular main body 110, the end sleeve 114A, and the rotary seal ring 15A, respectively. Uppermost and lowermost O-rings 117A prevent a quench fluid that flows through a first sealing liquid region Ra described below from entering another flow passage. The other O-rings 117A prevent the sealed fluid flowing through the respective second flow passages 118A from entering another flow passage or leaking to the outside.

As described above, N second flow passages 118A which are open on the outer circumferential side are formed in the outer cylinder body 5, and the respective through-holes 111a formed in the outer sleeve 111 correspond to opening holes of the second flow passages 118A on the outer circumferential side. Further, the respective second flow passages 118A are open toward the inner circumferential side of the case body 2, and open at different positions in the vertical direction (axial direction).

A plurality of through-holes 112a is formed in the inner sleeve 112 to penetrate therethrough in the radial direction at equal intervals in the circumferential direction. In addition, an annular gap 139B is formed between the inner sleeve 112 and the inner circumferential surface of the tubular main body 110 on the outside of the inner sleeve 112 in the radial direction, and each of the through-holes 112a is connected to the annular gap 139B. In addition, this annular gap 139B is connected to the third flow passage holes 142B of the tubular main body 110. Further, one third flow passage 118B through which the sealed fluid flows is configured by one third flow passage hole 142B inside the tubular main body 110, an annular gap 139B inside one inner sleeve 112, and the plurality of through-holes 112a in the inner sleeve 112.

O-rings 117B are provided among the tubular main body 110, the inner sleeve 112, and the rotary seal ring 12B, among the tubular main body 110, the pressing member 115B, and the rotary seal ring 15B, and among the tubular main body 110, the end sleeve 114B, and the rotary seal ring 15B, respectively. Uppermost and lowermost O-rings 117B prevent a quench fluid that flows through a second sealing liquid region Rb described below from entering another flow passage. The other O-rings 117B prevent the sealed fluid flowing through the respective third flow passages 118B from entering another flow passage or leaking to the outside.

As described above, M third flow passages 118B which are open on the inner circumferential side are formed in the outer cylinder body 5, and the respective through-holes 112a formed in the inner sleeve 112 correspond to opening holes of the third flow passages 118B on the inner circumferential side. Further, the respective third flow passages 118B are open toward the outer circumferential side of the inner shaft body 6, and open at different positions in the vertical direction (axial direction).

[Inner Shaft Body]

Figure 3:
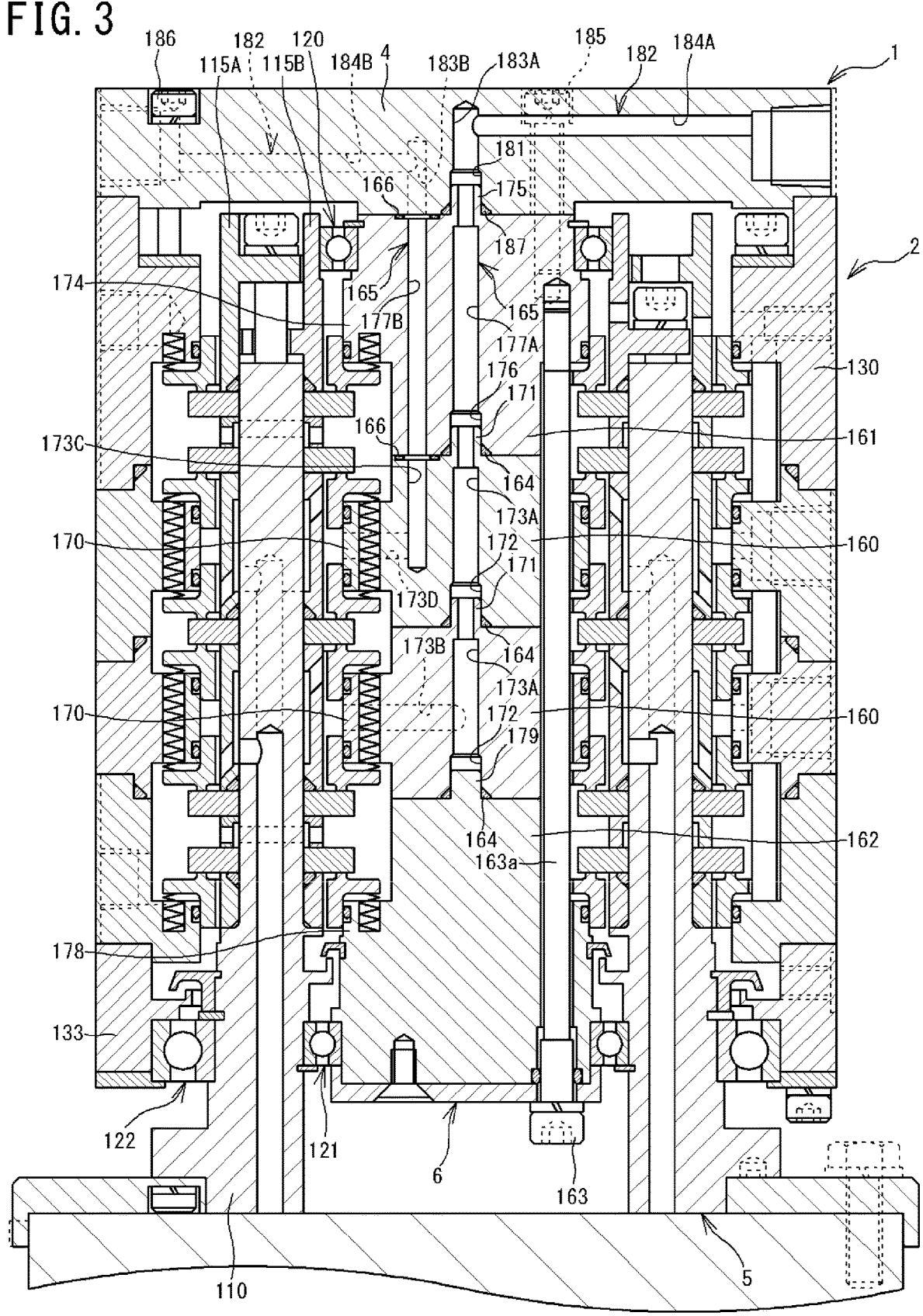
FIG. 3 is a longitudinal sectional view illustrating the rotary joint and is an explanatory view of an inner shaft body and a connection body.

FIG. 3 is the same figure as FIG. 1 and is a longitudinal sectional view illustrating the rotary joint 1. In FIG. 3, the inner shaft body 6 is concentrically disposed inside the outer cylinder body 5, and includes M (two in this example) split shaft portions 160, and an upper shaft portion 161 and a lower shaft portion 162 disposed above and below the split shaft portions 160. These shaft portions 160 to 162 are formed in a cylindrical shape and are connected and fixed by a bolt 163 while being stacked in the vertical direction. In this way, the inner shaft body 6 corresponds to a cylindrical structure as a whole. The inner shaft body 6 may be formed in another shape such as a tubular shape as a whole.

Each of the split shaft portions 160 has an annular protrusion 170 protruding outward in the radial direction. Similarly, the upper shaft portion 161 and the lower shaft portion 162 have annular protrusions 174 and 178, respectively, protruding outward in the radial direction.

An engagement protrusion 171 protruding upward is formed at a central part on an upper end surface of each of the split shaft portions 160, and an engagement depression 172 is formed at a central part on a lower end surface of each of the split shaft portions 160. Similarly, an engagement protrusion 175 protruding upward is formed at a central part on an upper end surface of the upper shaft portion 161, and an engagement depression 176 is formed at a central part on a lower end surface of the upper shaft portion 161. In addition, an engagement protrusion 179 protruding upward is formed at a central part on an upper end surface of the lower shaft portion 162.

The engagement protrusion 179 of the lower shaft portion 162 is engaged with the engagement depression 172 of the split shaft portion 160 adjacent thereto on the upper side, and the engagement protrusion 171 of the split shaft portion 160 is engaged with the engagement depression 172 of the split shaft portion 160 adjacent thereto on the upper side. The engagement depression 176 of the upper shaft portion 161 is engaged with the engagement protrusion 171 of the split shaft portion 160 adjacent thereto on the lower side.

O-rings 164 are provided between a root circumference of the engagement protrusion 179 and an opening edge of the engagement depression 172 engaged with each other, between a root circumference of the engagement protrusion 171 and an opening edge of the engagement depression 172 engaged with each other, and between a root circumference of the engagement protrusion 171 and an opening edge of the engagement depression 176 engaged with each other, respectively. In the present embodiment, axial length dimensions of the engagement protrusions 179 (171, 171) are set to be shorter than axial depth dimensions of the engagement depressions 172 (172, 176) engaged therewith.

[Connection Body]

Figure 4:
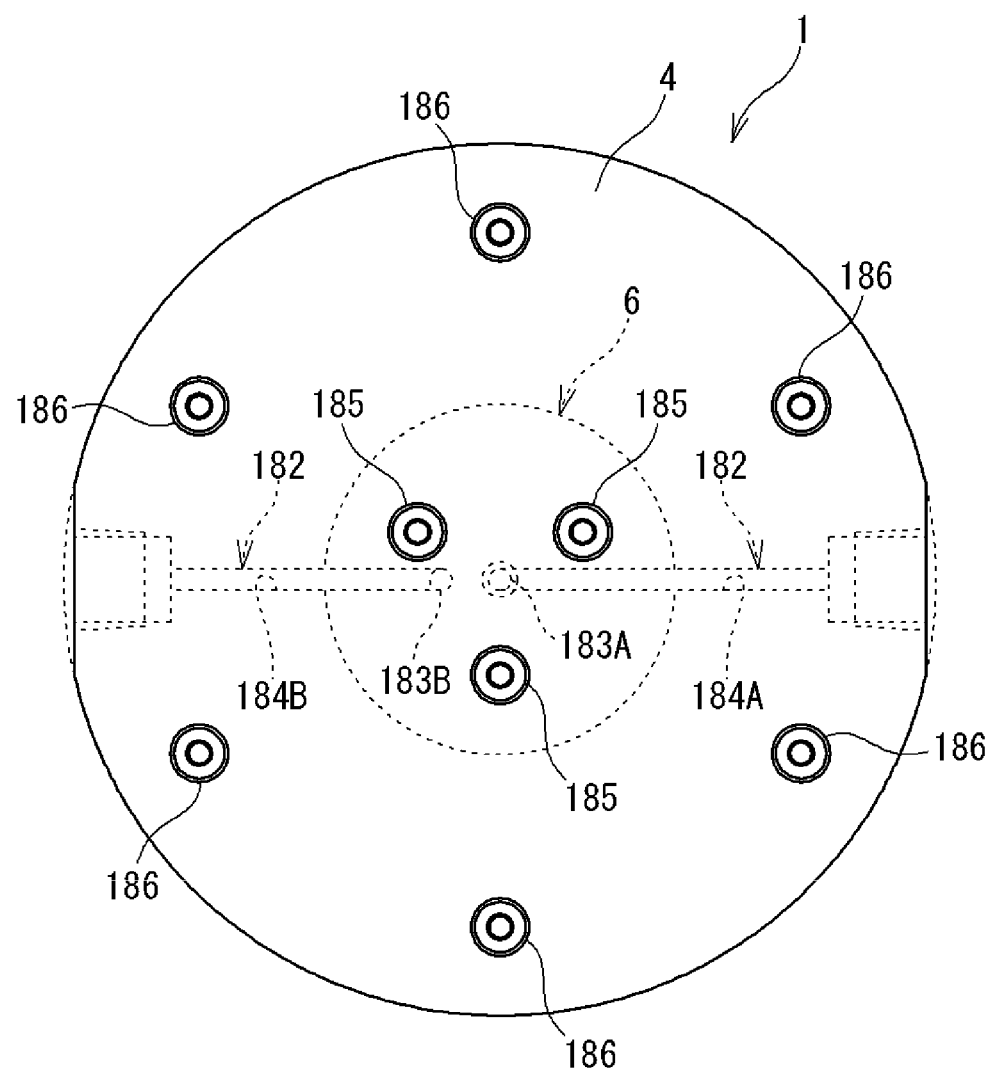
FIG. 4 is a plan view of the rotary joint viewed from above.

FIG. 4 is a plan view of the joint 1 viewed from above. In FIG. 3 and FIG. 4, the connection body 4 is formed in a disc shape, and an outer diameter thereof is set to be the same as an outer diameter of the case body 2. An engagement depression 181 is formed at a central part of a lower surface of the connection body 4, and the connection body 4 is concentrically placed on the upper end surface of the upper shaft portion 161 by the engagement protrusion 175 of the upper shaft portion 161 engaged with the engagement depression 181. An O-ring 187 is provided between a root circumference of the engagement protrusion 175 and an opening edge of the engagement depression 181. In the present embodiment, an axial length dimension of the engagement protrusion 175 is set to be shorter than an axial depth dimension of the engagement depression 181.

A portion around a center of the connection body 4 is connected and fixed to the upper shaft portion 161 by a plurality of (three in FIG. 4) bolts 185. In addition, an outer circumferential portion of the connection body 4 is connected and fixed to an upper end surface of the upper flange 130 of the case body 2 by a plurality of (six in FIG. 4) bolts 186 while coming into contact therewith.

As described above, the connection body 4 connects an upper end portion (one end portion in the axial direction) of the inner shaft body 6 and an upper end portion of the case body 2 across an upper end portion (one end portion in the axial direction) of the outer cylinder body 5, and the inner shaft body 6 is integrated with the case body 2.

A rolling bearing 120 is provided between the upper shaft portion 161 of the inner shaft body 6 and the pressing member 115B on the outer cylinder body 5 side. In addition, a rolling bearing 121 is provided between the lower shaft portion 162 of the inner shaft body 6 and the tubular main body 110 of the outer cylinder body 5. In this way, the outer cylinder body 5 is rotatable with respect to the inner shaft body 6.

A rolling bearing 122 is provided between the tubular main body 110 of the outer cylinder body 5 and the support flange 133 of the case body 2. In this way, the outer cylinder body 5 is rotatable with respect to the case body 2.

In the present embodiment, a rolling bearing is not provided between the pressing member 115A on the outer cylinder body 5 side and the upper flange 130 of the case body 2. However, instead of the rolling bearing 120, a rolling bearing may be provided between the pressing member 115A and the upper flange 130.

[Flow Passage of Inner Shaft Body]

M fourth flow passages 165 through which the sealed fluid flows are formed in the inner shaft body 6 to extend mainly in the vertical direction.

The respective fourth flow passages 165 are formed at predetermined intervals inside the inner shaft body 6. In addition, lower end sides of the respective fourth flow passages 165 are open at outer circumferential surfaces of different split shaft portions 160. In this way, the lower end sides of the respective fourth flow passages 165 are open at different height positions in the vertical direction.

In the present embodiment, two fourth flow passages 165 are formed in the inner shaft body 6. One of the fourth flow passages 165 is formed on a center line of the inner shaft body 6, and the other one of the fourth flow passages 165 is formed on the outer circumferential side of the one fourth flow passage 165 in the inner shaft body 6.

The one fourth flow passage 165 has a flow passage hole 177A formed at the central part of the upper shaft portion 161 to penetrate therethrough in the axial direction, and a flow passage hole 173A formed at the central part of each of the split shaft portions 160 to penetrate therethrough in the axial direction.

Both end portions of the flow passage hole 177A in the upper shaft portion 161 are open on an upper end surface of the engagement protrusion 175 and a bottom surface of the engagement depression 176. In this way, the flow passage hole 177A is connected to the flow passage hole 173A in the split shaft portion 160 adjacent thereto on the lower side through the engagement depression 176.

Similarly, both end portions of the flow passage hole 173A of each of the split shaft portions 160 are open at on upper end surface of the engagement protrusion 171 and a bottom surface of the engagement depression 172. In this way, flow passage holes 173A and 173A of adjacent split shaft portions 160 are connected through the engagement depression 172 of the upper split shaft portion 160.

A flow passage hole 173B extending in the radial direction is formed in the lower split shaft portion 160. An inner end of the flow passage hole 173B in the radial direction communicates with an intermediate portion of the flow passage hole 173A, and an outer end of the flow passage hole 173B in the radial direction is open on the outer circumferential surface of the split shaft portion 160.

Therefore, the one fourth flow passage 165 formed at the central part of the inner shaft body 6 includes the flow passage hole 177A and the engagement depression 176 of the upper shaft portion 161, the flow passage hole 173A and the engagement depression 172 of the upper split shaft portion 160, and the flow passage hole 173A and the flow passage hole 173B of the lower split shaft portion 160.

The other fourth flow passage 165 has a flow passage hole 177B formed in the upper shaft portion 161 to penetrate therethrough in the axial direction, and a flow passage hole 173C formed in the split shaft portion 160 adjacent to the upper shaft portion 161 on the lower side to extend in the axial direction.

Both end portions of the flow passage hole 177B are open on the upper end surface and the lower end surface of the upper shaft portion 161. An upper end side of the flow passage hole 173C is open at a position facing an opening of the flow passage hole 177B on a lower end side on the upper end surface of the split shaft portion 160. In this way, a lower end of the flow passage hole 177B is connected to an upper end of the flow passage hole 173C.

A flow passage hole 173D extending in the radial direction is formed in the split shaft portion 160 in which the flow passage hole 173C is formed. An inner end of the flow passage hole 173D in the radial direction communicates with a lower end portion of the flow passage hole 173C, and an outer end of the flow passage hole 173D in the radial direction is open on the outer circumferential surface of the split shaft portion 160.

Therefore, the other fourth flow passage 165 includes the flow passage hole 177B of the upper shaft portion 161 and the flow passage hole 173C and the flow passage hole 173D of the upper split shaft portion 160. O-rings 166 are provided between an upper end opening edge of the flow passage hole 177B and the lower surface of the connection body 4 and between an upper end opening edge of the flow passage hole 173C and a lower surface of the upper shaft portion 161, respectively.

As describe above, two fourth flow passages 165 opening on the outer circumferential side are formed in the inner shaft body 6 of the present embodiment, and the flow passage holes 173B and 173D formed in the respective split shaft portions 160 correspond to opening holes of the fourth flow passages 165 on the outer circumferential side. Further, the respective fourth flow passages 165 are open toward an inner circumferential side of the outer cylinder body 5 and open at different positions in the vertical direction (axial direction).

[Flow Passage of Connection Body]

M fifth flow passages 182 through which the sealed fluid flows are formed in the connection body 4 to extend mainly in the radial direction. The respective M fifth flow passages 182 are formed at predetermined intervals in the circumferential direction of the connection body 4.

Inner end sides of the respective fifth flow passages 182 in the radial direction are open at the lower surface side of the connection body 4, and respective upper ends of the M fourth flow passages 165 are connected to openings on the lower surface side. In addition, outer end sides of the respective fifth flow passages 182 in the radial direction are open at different positions in the circumferential direction on the outer circumferential surface of the connection body 4, and openings on the outer circumferential side correspond to connection ports to which the plurality of respective pipes of the fixed side member is connected.

In the present embodiment, two fifth flow passages 182 are formed in the connection body 4. One of the fifth flow passages 182 is formed to extend outward in the radial direction from the center line of the connection body 4. Further, the other one of the fifth flow passages 182 is formed to extend outward in the radial direction of the connection body 4 from the outer circumferential side of the one fifth flow passage 182 and is formed at an interval of, for example, 180° in the circumferential direction with respect to the one fifth flow passage 182.

The one fifth flow passage 182 has a flow passage hole 183A extending in the axial direction (thickness direction) at the central part of the connection body 4 and a flow passage hole 184A extending in the radial direction of the connection body 4.

A lower end side of the flow passage hole 183A is open on a bottom surface of the engagement depression 181 and is connected to the flow passage hole 177A in the upper shaft portion 161 of the inner shaft body 6 through the engagement depression 181.

An upper end side of the flow passage hole 183A is connected to an inner end of the flow passage hole 184A in the radial direction. An outer end of the flow passage hole 184A in the radial direction is open on the outer circumferential surface of the connection body 4. The one fifth flow passage 182 may only include the flow passage hole 183A. In this case, the upper end side of the flow passage hole 183A may be opened on an upper surface of the connection body 4.

The other fifth flow passage 182 has a flow passage hole 183B extending in the axial direction (thickness direction) on the outer circumferential side of the flow passage hole 183A in the connection body 4, and a flow passage hole 184B extending in the axial direction of the connection body 4.

A lower end side of the flow passage hole 183B is open at a position corresponding to the flow passage hole 177B in the upper shaft portion 161 of the inner shaft body 6 on the lower surface of the connection body 4, and is connected to the flow passage hole 177B.

An upper end side of the flow passage hole 183B is connected to an inner end of the flow passage hole 184B in the radial direction. An outer end of the flow passage hole 184B in the radial direction is open at a different position from an opening of the flow passage hole 184A on the outer circumferential surface of the connection body 4. The other fifth flow passage 182 may only include the flow passage hole 183B. In this case, the upper end side of the flow passage hole 183B may be opened on the upper surface of the connection body 4.

As described above, two fifth flow passages 182 opening on the outer circumferential side are formed in the connection body 4 of the present embodiment, and the flow passage holes 184A and 184B formed in the connection body 4 correspond to opening holes of the fifth flow passages 182 on the outer circumferential side. Further, the respective fifth flow passages 182 are open at different positions in the circumferential direction on the outer circumferential surface of the connection body 4.

[Mechanical Seal]

Figure 5:
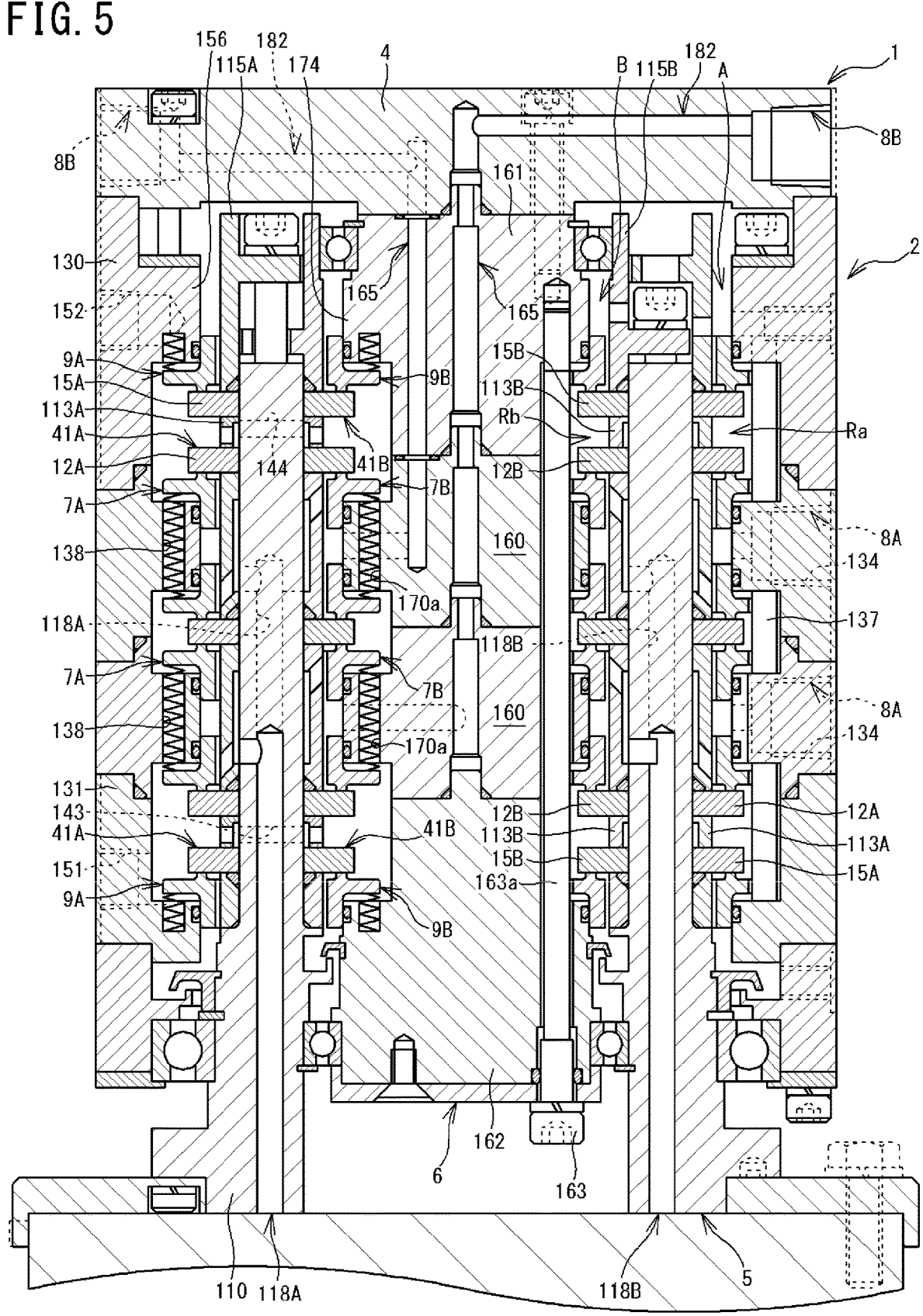
FIG. 5 is a longitudinal sectional view illustrating the rotary joint and is an explanatory view of a mechanical seal and a sealing liquid flow passage.

FIG. 5 is the same figure as FIG. 1 and is a longitudinal sectional view illustrating the rotary joint 1. In FIG. 5, a first annular space A is formed between the case body 2 and the outer cylinder body 5, and the first mechanical seal 7A is provided in the first annular space A. N first mechanical seals 7A are arranged side by side in the vertical direction along the outer cylinder body 5.

In addition, a second annular space B is formed between the outer cylinder body 5 and the inner shaft body 6, and the second mechanical seal 7B is provided in the second annular space B. M second mechanical seals 7B are arranged side by side in the vertical direction along the outer cylinder body 5.

The joint 1 of the present embodiment corresponds to a multi-flow passage rotary joint in which a plurality of (two in this example) first mechanical seals 7A and a plurality of (two in this example) second mechanical seals 7B are disposed in the axial direction.

Each of the first mechanical seals 7A is provided to configure the first fluid passage 8A using one first flow passage 134 of the case body 2 and one second flow passage 118A of the outer cylinder body 5.

Each of the second mechanical seals 7B is provided to configure the second fluid passage 8B using one third flow passage 118B of the outer cylinder body 5, one fourth flow passage 165 of the inner shaft body 6, and one fifth flow passage 182 of the connection body 4.

The plurality of respective first mechanical seals 7A has the same function. Here, a first mechanical seal 7A disposed on the lower side will be described as a representative. Similarly, the plurality of respective second mechanical seals 7B has the same function. Here, a second mechanical seal 7B disposed on the lower side will be described as a representative.

<First Mechanical Seal>

Figure 6:
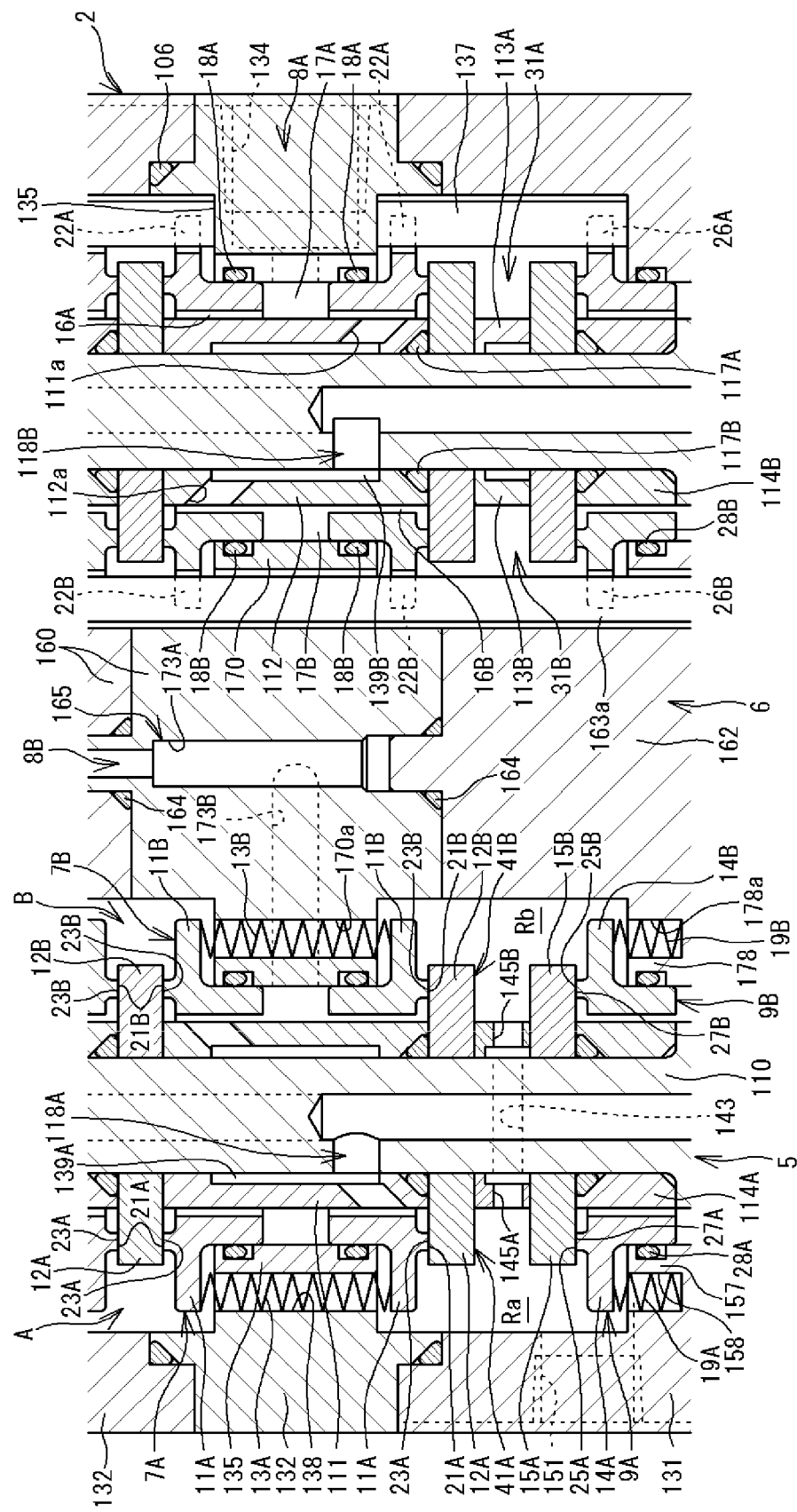
FIG. 6 is a cross-sectional view illustrating first and second mechanical seals disposed on a lower side and a part around the mechanical seals.

FIG. 6 is a cross-sectional view illustrating the first and second mechanical seals 7A and 7B disposed on the lower side and a part around the first and second mechanical seals 7A and 7B. In FIG. 6, one outer sleeve 111 and one flow passage flange 132 are disposed to face each other in the radial direction, and the second flow passage 118A which is open at the outer sleeve 111 and the first flow passage 134 which is open at the inner circumferential side of the flow passage flange 132 are open at substantially the same position in the axial direction. Further, one first mechanical seal 7A is provided therebetween.

The first mechanical seal 7A includes a static seal ring (first seal ring) 11A, a rotary seal ring (second seal ring) 12A, and a coil spring 13A serving as an elastic member.

A pair of upper and lower rotary seal rings 12A is configured as a set, and this set of rotary seal rings 12A and 12A corresponds to a component of one first mechanical seal 7A. In the present embodiment, a rotary seal ring 12A disposed on the upper side of the figure also serves as a rotary seal ring 12A of a first mechanical seal 7A adjacent thereto on the upper side.

The rotary seal ring 12A includes an annular member and is provided to be rotatable integrally with the tubular main body 110 as described above. An end surface of the outer sleeve 111 in the axial direction comes into contact with an end surface of the rotary seal ring 12A in the axial direction, and the outer sleeve 111 functions as a spacer between the rotary seal rings 12A and 12A.

A pair of upper and lower static seal rings 11A is configured as a set, and this set of static seal rings 11A and 11A corresponds to a component of one first mechanical seal 7A. Each of the static seal rings 11A includes an annular member and is prevented from rotating around the case body 2.

In the present embodiment, a shaft portion 137 of the bolt 109A penetrating the protrusion 135 of the flow passage flange 132 in the axial direction (vertical direction) is inserted into and fixed to the protrusion 135. A claw portion (depression) 22A interposing the shaft portion 137 from both sides thereof in the circumferential direction is formed in a part of the static seal ring 11A, and the static seal ring 11A is prevented from rotating by the claw portion 22A coming into contact with the shaft portion 137 from the both sides thereof in the circumferential direction.

The set of static seal rings 11A and 11A is provided between the rotary seal rings 12A and 12A adjacent to each other with the outer sleeve 111 interposed therebetween in the vertical direction on the outside of the outer sleeve 111 in the radial direction. An end surface of the outer sleeve 111 in the axial direction comes into contact with an inner side of an end surface of the rotary seal ring 12A in the radial direction. Further, the static seal ring 11A comes into contact with an outer side of the end surface of the rotary seal ring 12A in the radial direction.

That is, the set of static seal rings 11A and 11A have annular sealing surfaces 21A and 21A, and the sealing surfaces 21A and 21A come into contact with end surfaces of the rotary seal rings 12A and 12A present on both (upper and lower) sides thereof in the axial direction. Further, the rotary seal ring 12A has a sealing surface 23A coming into contact with the sealing surface 21A on an outer side of an end surface thereof in the radial direction.

The coil spring 13A is interposed between the pair of static seal ring 11A and 11A forming one set in a compressed state. For this reason, due to an elastic restoring force of the coil spring 13A, the static seal ring 11A is pressed in the axial direction toward the rotary seal ring 12A side, and a pressing force in the axial direction acts between the sealing surfaces 21A and 23A. A plurality of coil springs 13A is provided along the circumferential direction.

The coil spring 13A is inserted into an insertion hole 138 formed in the protrusion 135 of the flow passage flange 132 to penetrate the protrusion 135 in the axial direction (vertical direction), and is held by the insertion hole 138.

A plurality of insertion holes 138 is formed along the circumferential direction. The number of insertion holes 138 is the same as the number of coil spring 13A, and the insertion holes 138 are formed in accordance with arrangement of the coil spring 13A.

The coil spring 13A presses the static seal ring 11A and 11A toward both (upper and lower) sides in the axial direction, and this pressing force allows the sealing surface 21A of the static seal ring 11A to be pressed against the sealing surface 23A of the rotary seal ring 12A. In this way, both the sealing surfaces 21A and 23A may be brought into contact with each other in a pressed state in the axial direction.

Therefore, when the sealing surface 21A of the static seal ring 11A comes into sliding contact with the sealing surface 23A of the rotary seal ring 12A, a sealing function is exhibited such that the sealing fluid is prevented from leaking from between the sealing surfaces 21A and 23A. That is, a sealing function of the mechanical seal 7A is exhibited by a sliding contact action in association with relative rotation of the sealing surface 21A of the static seal ring 11A and the sealing surface 23A of the rotary seal ring 12A.

The one set of static seal rings 11A and 11A is provided to have a gap between the static seal rings 11A and 11A and an outer circumferential surface of the outer sleeve 111, and a tubular flow passage (tubular space) 16A is formed between the static seal rings 11A and 11A and the outer sleeve 111. The flow passage 16A is connected to the through-hole 111a of the outer sleeve 111. Further, the sealing fluid in the flow passage 16A is prevented from leaking to the outside by the sealing function of the sealing surfaces 21A and 23A.

Further, an annular flow passage 17A is formed between the set of static seal rings 11A and 11A, and the annular flow passage 17A is connected to the tubular flow passage 16A. Further, O-rings 18A are provided between an inner circumferential surface of the protrusion 135 of the flow passage flange 132 and outer circumferential surfaces of the static seal rings 11A and 11A facing the inner circumferential surface, and the sealed fluid in the annular flow passage 17A is prevented from leaking to the outside by a sealing function of the O-rings 18A. The static seal rings 11A and 11A are fit to and held by the protrusion 135 of the flow passage flange 132 through the O-rings 18A in an axially movable state.

In the way, the sealed annular flow passage 17A and the tubular flow passage 16A are interposed between the first flow passage 134 and the second flow passage 118A, and the flow passages 16A and 17A serve as flow passages that connect the first flow passage 134 and the second flow passage 118A to each other. As described above, the first flow passage 134 and the second flow passage 118A are connected by the flow passages 16A and 17A including the first mechanical seal 7A, and one independent first fluid passage 8A includes the first flow passage 134, the annular flow passage 17A, the tubular flow passage 16A, and the second flow passage 118A (including the annular gap 139A and the through-hole 111a of the outer sleeve 111).

As described above, the first mechanical seal 7A may divide the first annular space A formed between the case body 2 and the outer cylinder body 5 to form the flow passages (16A and 17A) connecting the first flow passage 134 and the second flow passage 118A to each other.

Further, since an axial force is applied to the set of static seal rings 11A by the coil spring 13A, the sealing surface 21A of the static seal rings 11A may be pressed against the sealing surface 23A of the rotary seal ring 12A.

In this way, when the outer cylinder body 5 rotates, the rotary seal ring 12A rotates together with the outer cylinder body 5 with respect to the static seal ring 11A in a stationary state in a rotation direction thereof, the sealing surface 21A of the static seal rings 11A comes into sliding contact with the sealing surface 23A of the rotary seal ring 12A, and the sealing fluid may be prevented from leaking to the outside from between the sealing surfaces 21A and 23A.

<Second Mechanical Seal>

One inner sleeve 112 and one split shaft portion 160 are disposed to face each other in the radial direction, and the third flow passage 118B which is open at the inner sleeve 112 and the flow passage hole 173B of the fourth flow passage 165 which is open at the outer circumferential side of split shaft portion 160 are open at substantially the same position in the axial direction. Further, one second mechanical seal 7B is provided therebetween.

The second mechanical seal 7B includes a static seal ring (third seal ring) 11B, a rotary seal ring (fourth seal ring) 12B, and a coil spring 13B serving as an elastic member.

A pair of upper and lower rotary seal rings 12B is configured as a set, and this set of rotary seal rings 12B and 12B corresponds to a component of one second mechanical seal 7B. In the present embodiment, a rotary seal ring 12B disposed on the upper side of the figure also serves as a rotary seal ring 12B of a second mechanical seal 7B adjacent thereto on the upper side.

The rotary seal ring 12B includes an annular member and is provided to be rotatable integrally with the tubular main body 110 as described above. An end surface of the rotary seal ring 12B in the axial direction comes into contact with an end surface of the inner sleeve 112 in the axial direction, and the inner sleeve 112 functions as a spacer between the rotary seal rings 12B and 12B.

A pair of upper and lower static seal rings 11B is configured as a set, and this set of static seal rings 11B and 11B corresponds to a component of one second mechanical seal 7B. Each of the static seal rings 11B includes an annular member and is prevented from rotating around the inner shaft body 6.

In the present embodiment, a shaft portion 163a of the bolt 163 penetrating the protrusion 170 of the split shaft portion 160 in the axial direction (vertical direction) is inserted into and fixed to the protrusion 170. A claw portion (depression) 22B interposing the shaft portion 163a from both sides thereof in the circumferential direction is formed in a part of the static seal ring 11B, and the static seal ring 11B is prevented from rotating by the claw portion 22B coming into contact with the shaft portion 163a from the both sides thereof in the circumferential direction.

The set of static seal rings 11B and 11B is provided between the rotary seal rings 12B and 12B adjacent to each other with the inner sleeve 112 interposed therebetween in the vertical direction on the outside of the inner sleeve 112 in the radial direction. An end surface of the inner sleeve 112 in the axial direction comes into contact with an outer side of an end surface of the rotary seal ring 12B in the radial direction. Further, the static seal ring 11B comes into contact with an inner side of the end surface of the rotary seal ring 12B in the radial direction.

That is, the set of static seal rings 11B and 11B have annular sealing surfaces 21B and 21B, and the sealing surfaces 21B and 21B come into contact with end surfaces of the rotary seal rings 12B and 12B present on both (upper and lower) sides thereof in the axial direction. Further, the rotary seal ring 12B has a sealing surface 23B coming into contact with the sealing surface 21B on an inner side of an end surface thereof in the radial direction.

The coil spring 13B is interposed between the pair of static seal ring 11B and 11B forming one set in a compressed state. For this reason, due to an elastic restoring force of the coil spring 13B, the static seal ring 11B is pressed in the axial direction toward the rotary seal ring 12B side, and a pressing force in the axial direction acts between the sealing surfaces 21B and 23B. A plurality of coil springs 13B is provided along the circumferential direction.

The coil spring 13B is inserted into an insertion hole 170a formed in the protrusion 170 of the split shaft portion 160 to penetrate the protrusion 170 in the axial direction (vertical direction), and is held by the insertion hole 170a. A plurality of insertion holes 170a is formed along the circumferential direction. The number of insertion holes 170a is the same as the number of coil spring 13B, and the insertion holes 170a are formed in accordance with arrangement of the coil spring 13B.

The coil spring 13B presses the static seal ring 11B and 11B toward both (upper and lower) sides in the axial direction, and this pressing force allows the sealing surface 21B of the static seal ring 11B to be pressed against the sealing surface 23B of the rotary seal ring 12B. In this way, both the sealing surfaces 21B and 23B may be brought into contact with each other in a pressed state in the axial direction.

Therefore, when the sealing surface 21B of the static seal ring 11B comes into sliding contact with the sealing surface 23B of the rotary seal ring 12B, a sealing function is exhibited such that the sealing fluid is prevented from leaking from between the sealing surfaces 21B and 23B. That is, a sealing function of the mechanical seal 7B is exhibited by a sliding contact action in association with relative rotation of the sealing surface 21B of the static seal ring 11B and the sealing surface 23B of the rotary seal ring 12B.

The one set of static seal rings 11B and 11B is provided to have a gap between the static seal rings 11B and 11B and an outer circumferential surface of the inner sleeve 112, and a tubular flow passage (tubular space) 16B is formed between the static seal rings 11B and 11B and the inner sleeve 112. The flow passage 16B is connected to the through-hole 112a of the inner sleeve 112. Further, the sealing fluid in the flow passage 16B is prevented from leaking to the outside by the sealing function of the sealing surfaces 21B and 23B and a sealing function of the O-rings 117B.

Further, an annular flow passage 17B is formed between the set of static seal rings 11B and 11B, and the annular flow passage 17B is connected to the tubular flow passage 16B. Further, O-rings 18B are provided between an outer circumferential surface of the protrusion 170 of the split shaft portion 160 and inner circumferential surfaces of the static seal rings 11B and 11B facing the outer circumferential surface, and the sealed fluid in the annular flow passage 17B is prevented from leaking to the outside by a sealing function of the O-rings 18B. The static seal rings 11B and 11B are fit to and held by the protrusion 170 of the split shaft portion 160 through the O-rings 18B in an axially movable state.

In the way, the sealed annular flow passage 17B and the tubular flow passage 16B are interposed between the third flow passage 118B and the fourth flow passage 165, and the flow passages 16B and 17B serve as flow passages that connect the third flow passage 118B and the fourth flow passage 165 to each other. As described above, the third flow passage 118B and the fourth flow passage 165 are connected by the flow passages 16B and 17B including the second mechanical seal 7B, and one independent second fluid passage 8B includes the third flow passage 118B (including the annular gap 139B and the through-hole 112a of the inner sleeve 111), the annular flow passage 17B, the tubular flow passage 16B, the fourth flow passage 165, and the fifth flow passage 182 (see FIG. 5) of the connection body 4.

As described above, the second mechanical seal 7B may divide the second annular space B formed between the inner shaft body 6 and the outer cylinder body 5 to form the flow passages (16B and 17B) connecting the third flow passage 118B and the fourth flow passage 165 to each other.

Further, since an axial force is applied to the set of static seal rings 11B by the coil spring 13B, the sealing surface 21B of the static seal rings 11B may be pressed against the sealing surface 23B of the rotary seal ring 12B.

In this way, when the outer cylinder body 5 rotates, the rotary seal ring 12B rotates together with the outer cylinder body 5 with respect to the static seal ring 11B in a stationary state in a rotation direction thereof, the sealing surface 21B of the static seal rings 11B comes into sliding contact with the sealing surface 23B of the rotary seal ring 12B, and the sealing fluid may be prevented from leaking to the outside from between the sealing surfaces 21B and 23B.

[Sealing Liquid Region of Quench Fluid]

A lubricating film is formed by a quench fluid (sealing fluid) between the sealing surface 21A of the static seal ring 11A of the first mechanical seal 7A and the sealing surface 23A of the rotary seal ring 12A. Similarly, a lubricating film is formed by a quench fluid between the sealing surface 21B of the static seal ring 11B of the second mechanical seal 7B and the sealing surface 23B of the rotary seal ring 12B.

For example, oil, water, etc. is used as the quench fluid, and water is used as the quench fluid in the present embodiment. This quench fluid may improve a sliding contact state between the sealing surfaces 21A and 23A (21B and 23B), reduce a sliding resistance of the sealing surfaces 21A and 23A (21B and 23B), and suppress occurrence of a defect such as abnormal wear, surface roughness, etc. between the sealing surfaces 21A and 23A (21B and 23B).

In FIG. 5, the quench fluid is supplied from a lower end portion of the case body 2 to the first annular space A and the second annular space B, and is discharged to the outside from an upper end portion of the case body 2.

The first sealing liquid region Ra through which the quench fluid is supplied is formed between the case body 2 and the first mechanical seal 7A in the first annular space A. In addition, the second sealing liquid region Rb through which the quench fluid is supplied is formed between the inner shaft body 6 and the second mechanical seal 7B in the second annular space B.

An inlet flow passage 151 for supplying the quench fluid to the first sealing liquid region Ra is formed at one place in the circumferential direction in the lower flange 131 of the case body 2. The inlet flow passage 151 is formed to penetrate the lower flange 131 in the radial direction across an outer circumferential surface and an inner circumferential surface of the lower flange 131.

An outlet flow passage 152 for discharging the quench fluid to the outside from the upper end portion of the first sealing liquid region Ra is formed at one place in the circumferential direction in the upper flange 130 of the case body 2. The outlet flow passage 152 is formed to penetrate the upper flange 130 in the radial direction across an outer circumferential surface and an inner circumferential surface of the upper flange 130.

[End Mechanical Seal]

End mechanical seals 9A that seal between the case body 2 and the outer cylinder body 5 are provided at both upper and lower end portions of the first sealing liquid region Ra. The end mechanical seals 9A are provided to prevent the quench fluid supplied to the first sealing liquid region Ra from leaking to the outside.

The end mechanical seals 9B that seal between the outer cylinder body 5 and the inner shaft body 6 are provided at both upper and lower end portions of the second sealing liquid region Rb. The end mechanical seals 9B are provided to prevent the quench fluid supplied to the second sealing liquid region Rb from leaking to the outside.

A pair of upper and lower end mechanical seals 9A has the same function. Here, an end mechanical seal 9A disposed on the lower side is described as a representative. Similarly, a pair of upper and lower end mechanical seals 9B has the same function. Here, an end mechanical seal 9B disposed on the lower side is described as a representative.

In FIG. 6, the end mechanical seal 9A disposed on the lower side of the first sealing liquid region Ra includes a static seal ring (fifth seal ring) 14A, a rotary seal ring (sixth seal ring) 15A, and a coil spring 19A serving as an elastic member.

The rotary seal ring 15A includes an annular member and is provided to be rotatable integrally with the tubular main body 110 as described above. The static seal ring 14A includes an annular member and is prevented from rotating around the case body 2.

In the present embodiment, the shaft portion 137 is fixed to the protrusion 157 of the lower flange 131 (the protrusion 156 of the upper flange 130 in the end mechanical seal 9A disposed on the upper side of FIG. 5, which is similarly applied to description below) by being inserted into the protrusion 157 in the axial direction (vertical direction). A claw portion (depression) 26A interposing the shaft portion 137 from both sides thereof in the circumferential direction is formed in a part of the static seal ring 14A, and the static seal ring 14A is prevented from rotating by the claw portion 26A coming into contact with the shaft portion 137 from the both sides thereof in the circumferential direction.

The static seal ring 14A is provided on the outer side of the end sleeve 114A (the pressing member 115A in the end mechanical seal 9A disposed on the upper side of FIG. 5, which is similarly applied to description below) in the radial direction. An end surface of the end sleeve 114A in the axial direction comes into contact with an inner side of an end surface of the rotary seal ring 15A in the radial direction. Further, the static seal ring 14A comes into contact with an outer side of the end surface of the rotary seal ring 15A in the radial direction.

That is, the static seal ring 14A has an annular sealing surface 25A, and the sealing surface 25A comes into contact with end surfaces of rotary seal rings 15A present at both (upper and lower) sides thereof in the axial direction. Further, the rotary seal ring 15A has a sealing surface 27A coming into contact with the sealing surface 25A at an outer side of the end surface thereof in the radial direction.

The coil spring 19A is interposed between the static seal ring 14A and the protrusion 157 of the lower flange 131 in a compressed state. For this reason, due to an elastic restoring force of the coil spring 19A, the static seal ring 14A is pressed in the axial direction toward the rotary seal ring 15A side, and a pressing force in the axial direction acts between the sealing surfaces 25A and 27A. A plurality of coil springs 19A is provided along the circumferential direction.

The coil spring 19A is inserted into an insertion hole 158 formed in the protrusion 157 of the lower flange 131 in the axial direction of the protrusion 157, and is held by the insertion hole 158. A plurality of insertion holes 158 is formed along the circumferential direction. The number of insertion holes 158 is the same as the number of coil springs 19A. In addition, the insertion holes 158 are formed in accordance with arrangement of the coil springs 19A.

The coil spring 19A presses the static seal ring 14A toward the upper side in the axial direction, and this pressing force allows the sealing surface 25A of the static seal ring 14A to be pressed against the sealing surface 27A of the rotary seal ring 15A. In this way, the both sealing surfaces 25A and 27A may be brought into contact with each other in a pressed state in the axial direction.

Therefore, the sealing surface 25A of the static seal ring 14A comes into sliding contact with the sealing surface 27A of the rotary seal ring 15A, and a sealing function is exhibited such that the quench fluid is prevented from leaking to the outside from between the sealing surfaces 25A and 27A. That is, a sealing function of the end mechanical seal 9A is exhibited by a sliding contact action in association with relative rotation of the sealing surface 25A of the static seal ring 14A and the sealing surface 27A of the rotary seal ring 15A. A lubricating film is formed by the quench fluid between both the sealing surfaces 25A and 27A.

An O-ring 28A is provided between an inner circumferential surface of the protrusion 157 of the lower flange 131 and an outer circumferential surface of the static seal ring 14A facing the inner circumferential surface, and a sealing function by the O-ring 28A prevents the quench fluid in the first sealing liquid region Ra from leaking to the outside. The static seal ring 14A is fit to and held by the protrusion 157 of the lower flange 131 through the O-ring 28A in an axially movable state.

The end mechanical seal 9B disposed on the lower side of the second sealing liquid region Rb includes a static seal ring (seventh seal ring) 14B, a rotary seal ring (eighth seal ring) 15B, and a coil spring 19B serving as an elastic member.

The rotary seal ring 15A includes an annular member and is provided to be rotatable integrally with the tubular main body 110 as described above. The static seal ring 14A includes an annular member and is prevented from rotating around the inner shaft body 6.

In the present embodiment, the shaft portion 163a is fixed to the protrusion 178 of the lower shaft portion 162 (the protrusion 174 of the upper shaft portion 161 in the end mechanical seal 9B disposed on the upper side of FIG. 5, which is similarly applied to description below) by being inserted into the protrusion 178 in the axial direction (vertical direction). A claw portion (depression) 26B interposing the shaft portion 163a from both sides thereof in the circumferential direction is formed in a part of the static seal ring 14B, and the static seal ring 14B is prevented from rotating by the claw portion 26B coming into contact with the shaft portion 163a from the both sides thereof in the circumferential direction.

The static seal ring 14B is provided on the inner side of the end sleeve 114B (the pressing member 115B in the end mechanical seal 9A disposed on the upper side of FIG. 5, which is similarly applied to description below) in the radial direction. An end surface of the end sleeve 114B in the axial direction comes into contact with an outer side of an end surface of the rotary seal ring 15B in the radial direction. Further, the static seal ring 14B comes into contact with an inner side of the end surface of the rotary seal ring 15B in the radial direction.

That is, the static seal ring 14B has an annular sealing surface 25B, and the sealing surface 25B comes into contact with end surfaces of rotary seal rings 15B present at both (upper and lower) sides thereof in the axial direction. Further, the rotary seal ring 15B has a sealing surface 27B coming into contact with the sealing surface 25A at an outer side of the end surface thereof in the radial direction.

The coil spring 19B is interposed between the static seal ring 14B and the protrusion 178 of the lower shaft portion 162 in a compressed state. For this reason, due to an elastic restoring force of the coil spring 19B, the static seal ring 14B is pressed in the axial direction toward the rotary seal ring 15B side, and a pressing force in the axial direction acts between the sealing surfaces 25B and 27B. A plurality of coil springs 19B is provided along the circumferential direction.

The coil spring 19B is inserted into an insertion hole 178a formed in the protrusion 178 of the lower shaft portion 162 in the axial direction of the protrusion 178, and is held by the insertion hole 178a. A plurality of insertion holes 178a is formed along the circumferential direction. The number of insertion holes 178a is the same as the number of coil springs 19B. In addition, the insertion holes 178a are formed in accordance with arrangement of the coil springs 19B.

The coil spring 19B presses the static seal ring 14B toward the upper side in the axial direction, and this pressing force allows the sealing surface 25B of the static seal ring 14B to be pressed against the sealing surface 27B of the rotary seal ring 15B. In this way, the both sealing surfaces 25B and 27B may be brought into contact with each other in a pressed state in the axial direction.

Therefore, the sealing surface 25B of the static seal ring 14B comes into sliding contact with the sealing surface 27B of the rotary seal ring 15B, and a sealing function is exhibited such that the quench fluid is prevented from leaking to the outside from between the sealing surfaces 25B and 27B. That is, a sealing function of the end mechanical seal 9B is exhibited by a sliding contact action in association with relative rotation of the sealing surface 25B of the static seal ring 14B and the sealing surface 27B of the rotary seal ring 15B. A lubricating film is formed by the quench fluid between both the sealing surfaces 25B and 27B.

An O-ring 28B is provided between an outer circumferential surface of the protrusion 178 of the lower shaft portion 162 and an inner circumferential surface of the static seal ring 14B facing the outer circumferential surface, and a sealing function by the O-ring 28B prevents the quench fluid in the second sealing liquid region Rb from leaking to the outside. The static seal ring 14B is fit to and held by the protrusion 178 of the lower shaft portion 162 through the O-ring 28B in an axially movable state.

[Communication Structure of First Sealing Liquid Region and Second Sealing Liquid Region]

In FIG. 5, a through-hole 143 for guiding a part of the quench fluid, which is supplied from the inlet flow passage 151 to the lower side of the first sealing liquid region Ra, to the lower side of the second sealing liquid region Rb is formed on the lower part side of the tubular main body 110. In addition, a through-hole 144 for guiding the quench fluid, which is guided from the lower side to the upper side of the second sealing liquid region Rb, to the upper side of the first sealing liquid region Ra is formed on an upper part side of the tubular main body 110.

In FIG. 6, the through-hole 143 formed on the lower part side of the tubular main body 110 is formed to penetrate the tubular main body 110 in the radial direction across the outer circumferential surface and the inner circumferential surface of the tubular main body 110.

An opening of the through-hole 143 on the outer circumferential surface of the tubular main body 110 is open on an inner side of the outer spacer 113A in the radial direction, and an opening of the through-hole 143 on the inner circumferential surface of the tubular main body 110 is open on an outer side of the inner spacer 113B in the radial direction.

A through-hole 145A is formed in the outer spacer 113A to penetrate the outer spacer 113A in the radial direction across the outer circumferential surface and the inner circumferential surface thereof. In this way, an opening of the through-hole 143 on one end side (outer end side in the radial direction) communicates with the first sealing liquid region Ra through the through-hole 145A of the outer spacer 113A and a gap 31A formed between the rotary seal ring 12A of the first mechanical seal 7A and the rotary seal ring 15A of the end mechanical seal 9A on an outer side of the through-hole 145A in the radial direction.

Therefore, the gap 31A formed using a part (the rotary seal ring 12A) of the first mechanical seal 7A and the through-hole 145A of the outer spacer 113A serve as a first communication path 41A that allows communication between the first sealing liquid region Ra and the opening of the through-hole 143 of the tubular main body 110 on one end side.

A communication hole 145B is formed in the inner spacer 113B to penetrate the inner spacer 113B in the radial direction across the outer circumferential surface and the inner circumferential surface thereof. In this way, an opening of the through-hole 143 on the other end side (inner end side in the radial direction) communicates with the second sealing liquid region Rb through the through-hole 145B of the inner spacer 113B and a gap 31B formed between the rotary seal ring 12B of the second mechanical seal 7B and the rotary seal ring 15B of the end mechanical seal 9B on an inner side of the communication hole 145B in the radial direction.

Therefore, the gap 31B formed using a part (the rotary seal ring 12B) of the second mechanical seal 7B and the through-hole 145B of the inner spacer 113B serve as a second communication path 41B that allows communication between the second sealing liquid region Rb and the opening of the through-hole 143 of the tubular main body 110 on the other end side.

In FIG. 5, as described above, when the quench fluid is supplied from the inlet flow passage 151 formed at one place of the case body 2 to the lower side of the first sealing liquid region Ra, a part of the quench fluid is supplied to the lower side of the second sealing liquid region Rb by passing through the first communication path 41A on the first mechanical seal 7A side, the through-hole 143 of the tubular main body 110, and the second communication path 41B on the second mechanical seal 7B side in this order.

The other part of the quench fluid supplied to the lower side of the first sealing liquid region Ra is guided to the upper side of the first sealing liquid region Ra by passing through the insertion hole 138 of each flow passage flange 132. Similarly, the quench fluid supplied to the lower side of the second sealing liquid region Rb is guided to the upper side of the second sealing liquid region Rb by passing through the insertion hole 170a of each split shaft portion 160.

The quench fluid guided to the upper side of the second sealing liquid region Rb is guided to the upper side of the first sealing liquid region Ra by passing through the second communication path 41B formed on the upper side of the second sealing liquid region Rb, the through-hole 144 formed on the upper side of the tubular main body 110, and the first communication path 41A formed on the upper side of the first sealing liquid region Ra in this order.

Then, the quench fluid guided from the lower side to the upper side of the first sealing liquid region Ra and the quench fluid guided from the upper side of the second sealing liquid region Rb to the upper side of the first sealing liquid region Ra through the through-hole 144, etc. are discharged to the outside from the outlet flow passage 152 of the case body 2.

Modified Example of Communication Structure

Figure 7:
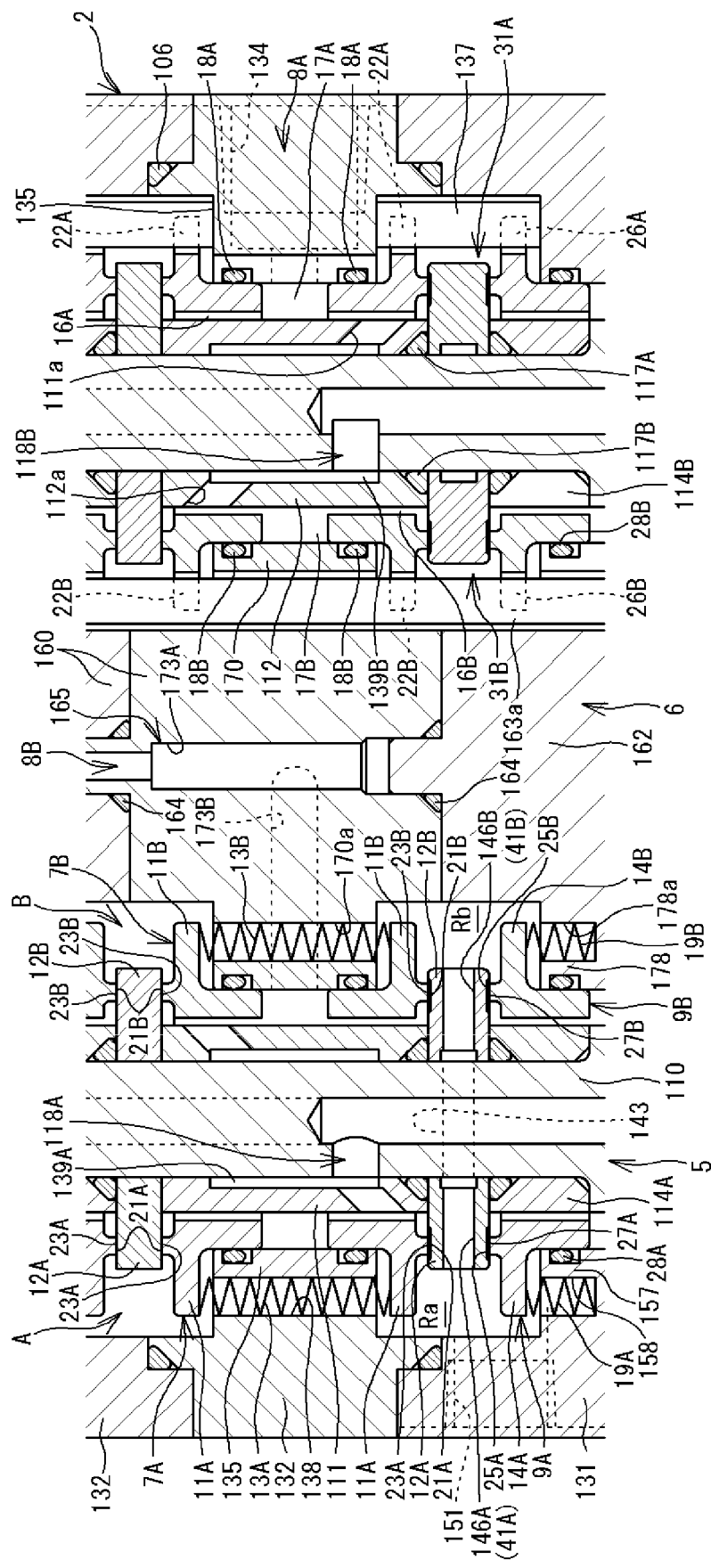
FIG. 7 is a cross-sectional view illustrating a modified example of a communication structure of a first sealing liquid region and a second sealing liquid region.
Figure 8:
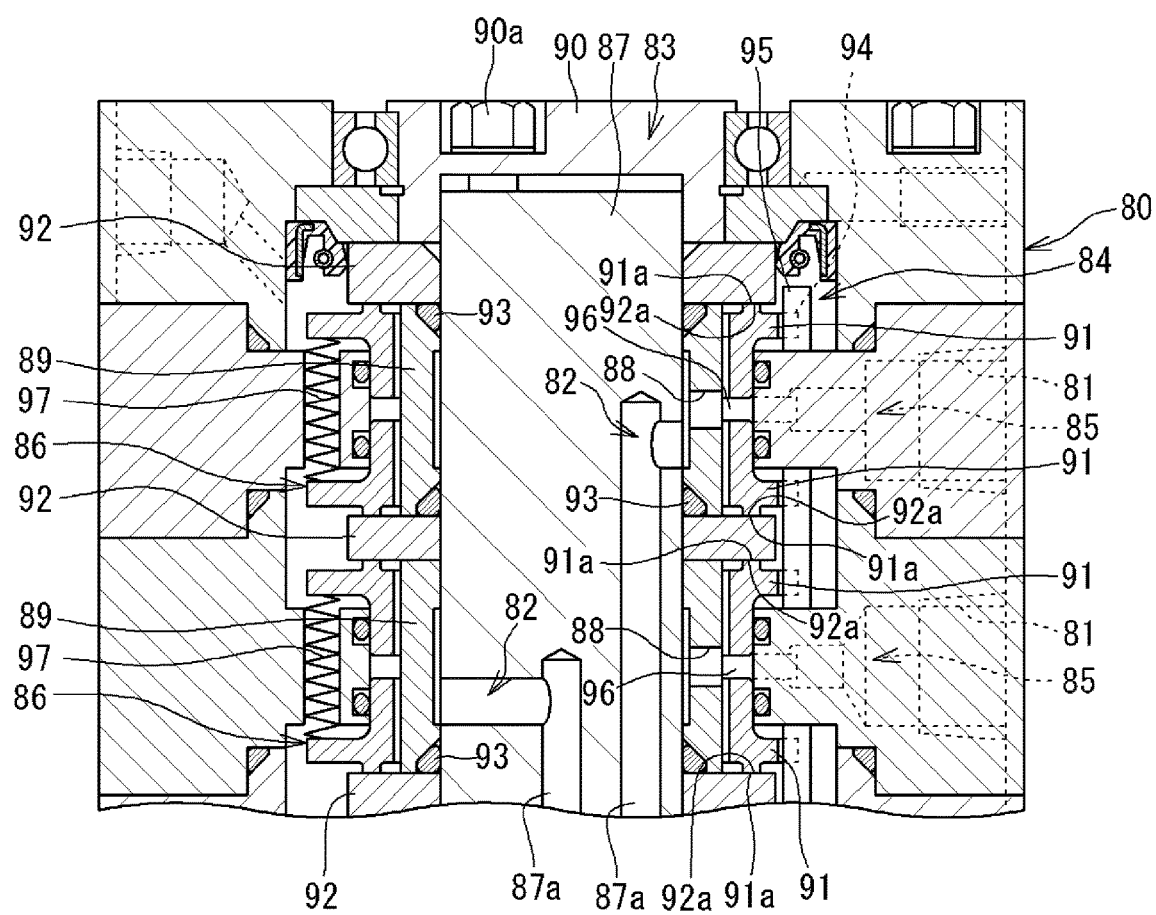
FIG. 8 is a longitudinal sectional view of a conventional rotary joint.

FIG. 7 is a cross-sectional view illustrating a modified example of the communication structure of the first sealing liquid region Ra and the second sealing liquid region Rb. In the present modified example, the rotary seal rings 12A and 12B disposed on the outermost sides of the first and second mechanical seals 7A and 7B in the axial direction also serve as the rotary seal rings 15A and 15B of the end mechanical seals 9A and 9B. Further, communication holes 146A and 146B are formed in the respective rotary seal rings 12A and 12B to penetrate the rotary seal rings 12A and 12B in the radial direction across the outer circumferential surfaces and the inner circumferential surfaces thereof.

In this way, the opening of the through-hole 143 of the tubular main body 110 on the one end side (outer end side in the radial direction) communicates with the first sealing liquid region Ra through the communication hole 146A of the rotary seal ring 12A. Therefore, the communication hole 146A formed using a part of the first mechanical seal 7A (the rotary seal ring 12A) serves as the first communication path 41A that allows communication between the first sealing liquid region Ra and the opening of the through-hole 143 of the tubular main body 110 on the one end side.

In addition, the opening of the through-hole 143 of the tubular main body 110 on the other end side (inner end side in the radial direction) communicates with the second sealing liquid region Rb through the communication hole 146B of the rotary seal ring 12B. Therefore, the communication hole 146B formed using a part of the second mechanical seal 7B (the rotary seal ring 12B) serves as the second communication path 41B that allows communication between the second sealing liquid region Rb and the opening of the through-hole 143 of the tubular main body 110 on the other end side.

As described above, according to the rotary joint 1 of the present embodiment, two different fluid passages 8A and 8B may be formed by providing the mechanical seals 7A and 7B in the two respective annular spaces A and B formed on the outer circumferential side and the inner circumferential side of the outer cylinder body 5. Therefore, it is possible to suppress an increase in whole length of the rotary joint 1 in the axial direction when compared to a case in which mechanical seals are arranged side by side in the axial direction in one annular space as in the past. In addition, since each component in the mechanical seals 7A and 7B may not be formed to be small, seal performance is not degraded.

In addition, since a plurality of first mechanical seals 7A is provided in the axial direction of the first annular space A, and a plurality of second mechanical seals 7B is provided in the axial direction of the second annular space B, a plurality of first fluid passage 8A and a plurality of second fluid passage 8B may be formed. Therefore, even when the number of fluid passages 8A and 8B increases, it is possible to suppress an increase in whole length of the rotary joint 1 in the axial direction when compared to the case in which mechanical seals are arranged side by side in the axial direction in one annular space as in the past. As a result, the outer cylinder body 5 corresponding to a rotating side may be inhibited from elongating in the axial direction, and thus vibration during rotation of the outer cylinder body 5 may be suppressed.

In addition, since the first sealing liquid region Ra and the second sealing liquid region Rb are connected through the first communication path 41A, the through-holes 143 and 144 of the outer cylinder body 5, and the second communication path 41B, when the quench fluid is supplied to one of the first sealing liquid region Ra and the second sealing liquid region Rb, the quench fluid may be supplied to the other region. Therefore, only one inlet flow passage 151 and one outlet flow passage 152 for the sealing liquid are formed in the rotary joint 1, and thus the structure may be simplified.

In addition, since an upper end portion of the inner shaft body 6 and the case body 2 are integrated by the connection body 4, one of a rolling bearing that supports the upper end portion of the outer cylinder body 5 in a relatively rotatable manner with respect to the case body 2 and a rolling bearing that supports the upper end portion of the inner shaft body 6 in a relatively rotatable manner with respect to the upper end portion of the outer cylinder body 5 may not be provided. In this way, the number of parts may be reduced, and thus it is possible to further attempt simplification of the structure and a reduction in manufacturing cost.

It should be considered that the embodiment disclosed this time is an example in all respects and is not restrictive. The scope of the invention is indicated by the claims rather than the above meaning, and is intended to include meanings equivalent to the claims and all modifications within the scope.

For example, even though the rotary joint 1 in the above embodiment is disposed such that the axial direction thereof corresponds to the vertical direction, the rotary joint 1 may be disposed such that the axial direction corresponds to a horizontal direction.

In addition, in the rotary joint 1 in the above embodiment, the case body 2 and the inner shaft body 6 are attached to the fixed side member, and the outer cylinder body 5 is attached to the rotating side member. However, the outer cylinder body 5 may be attached to the fixed side member, and the case body 2 and the inner shaft body 6 may be attached to the rotating side member.

In addition, the rotary joint 1 in the above embodiment has a structure in which the case body 2 and the inner shaft body 6 are connected by the connection body 4. However, the rotary joint 1 may have a structure not having the connection body 4, that is, a structure in which the case body 2 and the inner shaft body 6 are not connected to each other. In this case, a rolling bearing may be added between the pressing member 115A and the upper flange 130, the upper end side of the fourth flow passage 165 may be open on an upper end surface of the inner shaft body 6, and this opening may be used as the connection port.

1 rotary joint
  2 case body
  4 connection body
  5 outer cylinder body
  6 inner shaft body
  7A first mechanical seal
  7B second mechanical seal
  16A flow passage
  16B flow passage
  17A flow passage
  17B flow passage
  41A first communication path
  41B second communication path
  118A second flow passage
  118B third flow passage
  134 first flow passage
  143 through-hole
  144 through-hole
  165 fourth flow passage
  A first annular space
  B second annular space
  Ra first sealing liquid region
  Rb second sealing liquid region Without further elaboration, it is believed that one skilled in the art can, using the preceding description, utilize the present invention to its fullest extent. The preceding preferred specific embodiments are, therefore, to be construed as merely illustrative, and not limitative of the remainder of the disclosure in any way whatsoever.

In the foregoing and in the examples, all temperatures are set forth uncorrected in degrees Celsius and, all parts and percentages are by weight, unless otherwise indicated.

The entire disclosures of all applications, patents and publications, cited herein and of corresponding JP application No. 2016-163363, filed Aug. 24, 2016, are incorporated by reference herein.

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

The invention claimed is:

1. A rotary joint comprising:
a tubular case body in which a first flow passage, open on an inner circumferential side of the tubular case body, is formed;
an outer cylinder body provided to be relatively rotatable inside the tubular case body, wherein a second flow passage, open on an outer circumferential side of the outer cylinder body, and a third flow passage, open on an inner circumferential side of the outer cylinder body, are formed in the outer cylinder body;
an inner shaft body provided to be relatively rotatable inside the outer cylinder body, a fourth flow passage, open on an outer circumferential side of the inner shaft body, is formed in the inner shaft body;
a first mechanical seal provided in a first annular space formed between the tubular case body and the outer cylinder body to form a first connecting flow passage that connects the first flow passage and the second flow passage to each other by dividing the first annular space;
a second mechanical seal provided in a second annular space formed between the outer cylinder body and the inner shaft body to form a second connecting flow passage that connects the third flow passage and the fourth flow passage to each other by dividing the second annular space;
a first communication path formed using a part of the first mechanical seal to allow communication between a first sealing liquid region and a first opening of a through-hole disposed on one end side of the through-hole; and
a second communication path formed using a part of the second mechanical seal to allow communication between a second sealing liquid region and a second opening of the through-hole disposed on an other end side of the through-hole,
wherein the first sealing liquid region, in which a sealing liquid is supplied between the first mechanical seal and the tubular case body, is formed in the first annular space,
the second sealing liquid region, in which a sealing liquid is supplied between the second mechanical seal and the inner shaft body, is formed in the second annular space, and
the through-hole penetrates the outer cylinder body in a radial direction from an outer circumferential surface of the outer cylinder body to an inner circumferential surface of the outer cylinder body.

2. The rotary joint according to claim 1,
wherein a plurality of first mechanical seals is provided in an axial direction of the first annular space, and
a plurality of second mechanical seals is provided in an axial direction of the second annular space.

3. The rotary joint according to claim 1, further comprising
a connection body connected to one axial end portion of the inner shaft body and the tubular case body.

* * * * *